United States Patent
Raghoebardajal et al.

(10) Patent No.: US 10,571,700 B2
(45) Date of Patent: Feb. 25, 2020

(54) HEAD-MOUNTABLE DISPLAY SYSTEM

(71) Applicant: Sony Interactive Entertainment Europe Limited, London (GB)

(72) Inventors: Sharwin Winesh Raghoebardajal, London (GB); Simon John Hall, London (GB)

(73) Assignee: Sony Interactive Entertainment Europe Limited (GB)

( * ) Notice: Subject to any disclaimer, the term of this patent is extended or adjusted under 35 U.S.C. 154(b) by 0 days.

(21) Appl. No.: 16/082,609

(22) PCT Filed: Mar. 10, 2017

(86) PCT No.: PCT/GB2017/050661
§ 371 (c)(1),
(2) Date: Sep. 6, 2018

(87) PCT Pub. No.: WO2017/153776
PCT Pub. Date: Sep. 14, 2017

(65) Prior Publication Data
US 2019/0033600 A1 Jan. 31, 2019

(30) Foreign Application Priority Data
Mar. 11, 2016 (GB) .................................. 1604176.6

(51) Int. Cl.
*G02B 27/01* (2006.01)
*H04N 5/58* (2006.01)
(Continued)

(52) U.S. Cl.
CPC .......... *G02B 27/0172* (2013.01); *G02B 5/20* (2013.01); *G09G 3/22* (2013.01); *H04N 5/58* (2013.01);
(Continued)

(58) Field of Classification Search
None
See application file for complete search history.

(56) References Cited

U.S. PATENT DOCUMENTS 6,900,778 B1  5/2005  Yamamoto
2008/0291120 A1* 11/2008  Wu ........................ G02B 7/002
345/8

(Continued)

FOREIGN PATENT DOCUMENTS

EP    2941100 A2    11/2015
WO    2009147595 A2  12/2009
(Continued)

OTHER PUBLICATIONS

Combined British Search and Examination Report for Application No. GB1604176.6 dated Sep. 13, 2016, 9 pages.
International Search Report and Written Opinion for Application No. PCT/GB2017/050661 dated Jul. 24, 2017, 16 pages.
British Office Action for GB1604176.6 dated Apr. 5, 2019.

*Primary Examiner* — Duane N Taylor, Jr.
(74) *Attorney, Agent, or Firm* — Lerner, David, Littenberg, Krumholz & Mentlik, LLP (57) ABSTRACT

A head mountable display (HMD) system comprises a detector and a controller. The detector is configured to detect a first illumination level in a first one of a display image for display to a user via an HMD and an ambient environment around the HMD. The controller is configured to control a second illumination level in a second one of the display image for display to a user via an HMD and the ambient environment around the HMD, according to the detection.

18 Claims, 6 Drawing Sheets

(51) Int. Cl.
*H04N 13/344* (2018.01)
*H04N 13/332* (2018.01)
*G02B 5/20* (2006.01)
*G09G 3/22* (2006.01)

(52) U.S. Cl.
CPC ......... *H04N 13/332* (2018.05); *H04N 13/344* (2018.05); *G09G 2360/144* (2013.01)

(56) References Cited

U.S. PATENT DOCUMENTS

| | | | | |
|---|---|---|---|---|
| 2013/0113973 | A1* | 5/2013 | Miao | G09G 3/003 |
| | | | | 348/333.01 |
| 2013/0300766 | A1* | 11/2013 | Mukawa | G02B 27/0179 |
| | | | | 345/633 |
| 2015/0302659 | A1* | 10/2015 | O'Connor | G06F 3/011 |
| | | | | 345/633 |
| 2017/0184894 | A1* | 6/2017 | Hayashi | H04N 9/3173 |
| 2018/0067326 | A1* | 3/2018 | Yonekubo | G02B 5/09 |

FOREIGN PATENT DOCUMENTS

| | | |
|---|---|---|
| WO | 2011073817 A1 | 6/2011 |
| WO | 2012133379 A1 | 10/2012 |
| WO | 2013066521 A1 | 5/2013 |
| WO | 2013142643 A1 | 9/2013 |
| WO | 2017153776 A1 | 9/2017 |

\* cited by examiner

LEFT · RIGHT

LEFT · RIGHT

HEAD-MOUNTABLE DISPLAY SYSTEM

CROSS REFERENCE TO RELATED APPLICATIONS

The present application is a national phase entry under 35 U.S.C. § 371 of International Application No. PCT/GB2017/050661, filed Mar. 10, 2017, published in English, which claims the benefit of and priority to GB Patent Application No. 1604176.6, filed Mar. 11, 2016, the entire disclosure of which is incorporated by reference herein.

BACKGROUND

Field of the Disclosure

This disclosure relates to head-mountable display systems.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

A head-mountable display (HMD) is one example of a head-mountable apparatus. In an HMD, an image or video display device is provided which may be worn on the head or as part of a helmet. Either one eye or both eyes are provided with small electronic display devices.

Although the original development of HMDs was perhaps driven by the military and professional applications of these devices, HMDs are becoming more popular for use by casual users in, for example, computer game or domestic computing applications.

The foregoing paragraphs have been provided by way of general introduction, and are not intended to limit the scope of the following claims. The described embodiments, together with further advantages, will be best understood by reference to the following detailed description taken in conjunction with the accompanying drawings.

Various aspects and features of the present disclosure are defined in the appended claims and within the text of the accompanying description and include at least a video server, a head mountable display, a system, a method of operating a video server or a head-mountable apparatus as well as a computer program and a video signal.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
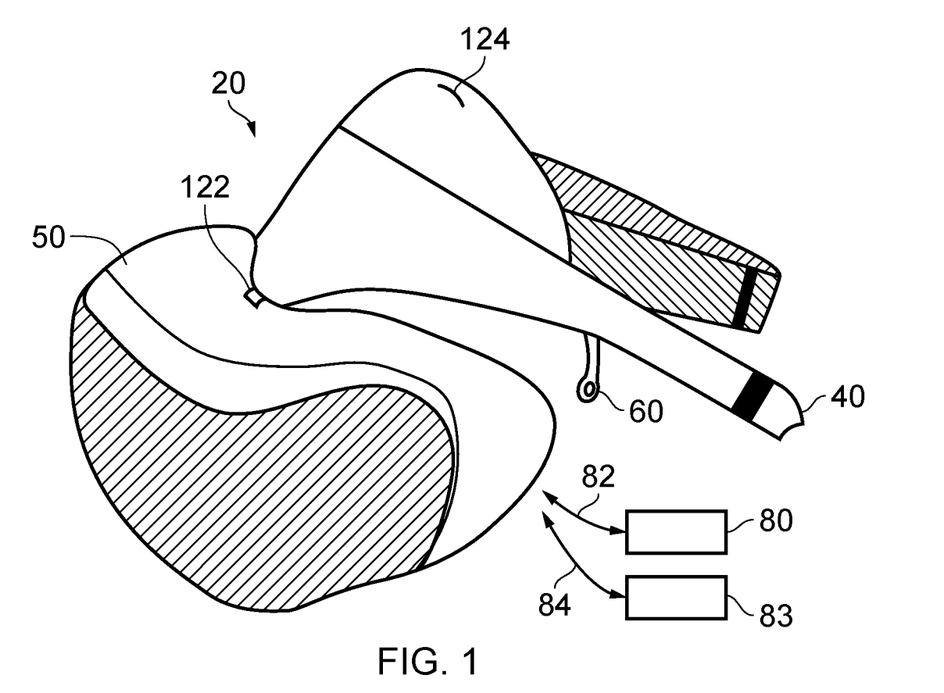
FIG. 1 schematically illustrates an HMD to be worn by a user.

Referring now to FIG. 1, an HMD 20 (as an example of a generic head-mountable apparatus) is wearable by a user. The HMD comprises a frame 40, in this example formed of a rear strap and an upper strap, and a display portion 50.

Note that the HMD of FIG. 1 may comprise further features, to be described below in connection with other drawings, but which are not shown in FIG. 1 for clarity of this initial explanation.

The HMD of FIG. 1 completely (or at least substantially completely) obscures the user's view of the surrounding environment. All that the user can see is the pair of images displayed within the HMD, one image for each eye.

The HMD has associated headphone audio transducers or earpieces 60 which fit into the user's left and right ears. The earpieces 60 replay an audio signal provided from an external source, which may be the same as the video signal source which provides the video signal for display to the user's eyes.

The combination of the fact that the user can see only what is displayed by the HMD and, subject to the limitations of the noise blocking or active cancellation properties of the earpieces and associated electronics, can hear only what is provided via the earpieces, mean that this HMD may be considered as a so-called "full immersion" HMD. Note however that in some embodiments the HMD is not a full immersion HMD, and may provide at least some facility for the user to see and/or hear the user's surroundings. This could be by providing some degree of transparency or partial transparency in the display arrangements, and/or by projecting a view of the outside (captured using a camera, for example a camera mounted on the HMD) via the HMD's displays, and/or by allowing the transmission of ambient sound past the earpieces and/or by providing a microphone to generate an input sound signal (for transmission to the earpieces) dependent upon the ambient sound.

A front-facing camera 122 may capture images to the front of the HMD, in use. A Bluetooth® antenna 124 may provide communication facilities or may simply be arranged as a directional antenna to allow a detection of the direction of a nearby Bluetooth transmitter.

In operation, a video signal is provided for display by the HMD. This could be provided by an external video signal source 80 such as a video games machine or data processing apparatus (such as a personal computer), in which case the signals could be transmitted to the HMD by a wired or a wireless connection 82. Examples of suitable wireless connections include Bluetooth® connections. The external apparatus could communicate with a video server. Audio signals for the earpieces 60 can be carried by the same connection. Similarly, any control signals passed from the HMD to the video (audio) signal source may be carried by the same connection. Furthermore, a power supply 83 (including one or more batteries and/or being connectable to a mains power outlet) may be linked by a cable 84 to the HMD. Note that the power supply 83 and the video signal source 80 may be separate units or may be embodied as the same physical unit. There may be separate cables for power and video (and indeed for audio) signal supply, or these may be combined for carriage on a single cable (for example, using separate conductors, as in a USB cable, or in a similar way to a "power over Ethernet" arrangement in which data is carried as a balanced signal and power as direct current, over the same collection of physical wires). The video and/or audio signal may be carried by, for example, an optical fibre cable. In other embodiments, at least part of the functionality associated with generating image and/or audio signals for presentation to the user may be carried out by circuitry and/or processing forming part of the HMD itself. A power supply may be provided as part of the HMD itself.

Some embodiments of the disclosure are applicable to an HMD having at least one electrical and/or optical cable linking the HMD to another device, such as a power supply and/or a video (and/or audio) signal source. So, embodiments of the disclosure can include, for example:

(a) an HMD having its own power supply (as part of the HMD arrangement) but a cabled connection to a video and/or audio signal source;

(b) an HMD having a cabled connection to a power supply and to a video and/or audio signal source, embodied as a single physical cable or more than one physical cable;

(c) an HMD having its own video and/or audio signal source (as part of the HMD arrangement) and a cabled connection to a power supply;

(d) an HMD having a wireless connection to a video and/or audio signal source and a cabled connection to a power supply;

(e) an HMD having an on-board power supply and a wireless connection to a video and/or audio signal source;

(f) an HMD having an on-board power supply and its own video and/or audio signal source; or (g) an HMD having its own power supply and no cabled connections to any other device.

If one or more cables are used, the physical position at which the cable 82 and/or 84 enters or joins the HMD is not particularly important from a technical point of view. Aesthetically, and to avoid the cable(s) brushing the user's face in operation, it would normally be the case that the cable(s) would enter or join the HMD at the side or back of the HMD (relative to the orientation of the user's head when worn in normal operation). Accordingly, the position of the cables 82, 84 relative to the HMD in FIG. 1 should be treated merely as a schematic representation.

Accordingly, the arrangement of FIG. 1 provides an example of a head-mountable display system comprising a frame to be mounted onto an observer's head, the frame defining one or two eye display positions which, in use, are positioned in front of a respective eye of the observer and a display element mounted with respect to each of the eye display positions, the display element providing a virtual image of a video display of a video signal from a video signal source to that eye of the observer.

FIG. 1 shows just one example of an HMD. Other formats are possible: for example an HMD could use a frame more similar to that associated with conventional eyeglasses, namely a substantially horizontal leg extending back from the display portion to the top rear of the user's ear, possibly curling or diverting down behind the ear. In other (not full immersion) examples, the user's view of the external environment may not in fact be entirely obscured; the displayed images could be arranged so as to be superposed (from the user's point of view) over the external environment.

Figure 2:
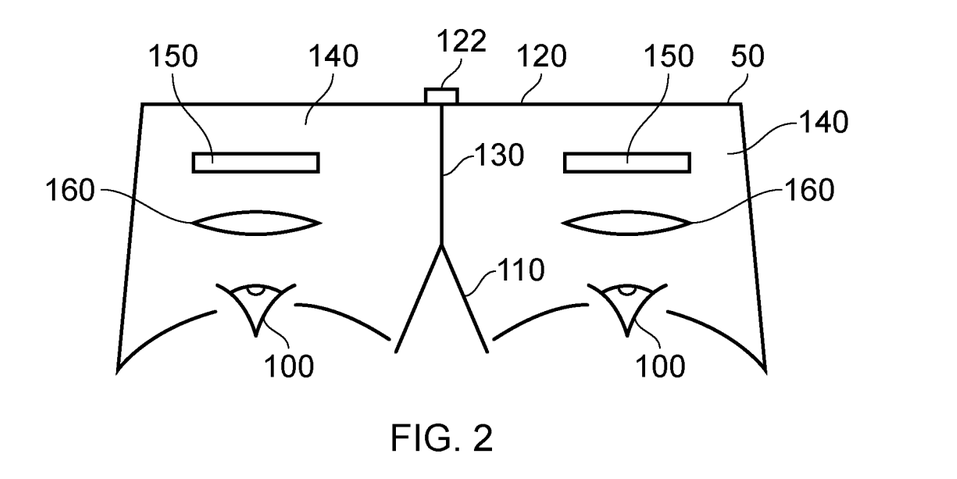
FIG. 2 is a schematic plan view of an HMD.

In the example of FIG. 1, a separate respective display is provided for each of the user's eyes. A schematic plan view of how this is achieved is provided as FIG. 2, which illustrates the positions 100 of the user's eyes and the relative position 110 of the user's nose. The display portion 50, in schematic form, comprises an exterior shield 120 to mask ambient light from the user's eyes and an internal shield 130 which prevents one eye from seeing the display intended for the other eye. The combination of the user's face, the exterior shield 120 and the interior shield 130 form two compartments 140, one for each eye. In each of the compartments there is provided a display element 150 and one or more optical elements 160. These can cooperate to display three dimensional or two dimensional content.

In some situations, an HMD may be used simply to view movies, or other video content or the like. If the video content is panoramic (which, for the purposes of this description, means that the video content extends beyond the displayable area of the HMD so that the viewer can, at any time, see only a portion but not all of the video content), or in other uses such as those associated with virtual reality (VR) or augmented reality (AR) systems, the user's viewpoint needs to track movements with respect to a real or virtual space in which the user is located. Arrangements to achieve this will be discussed with reference to FIGS. 5, 6*a* and 6*b*.

Figure 3:
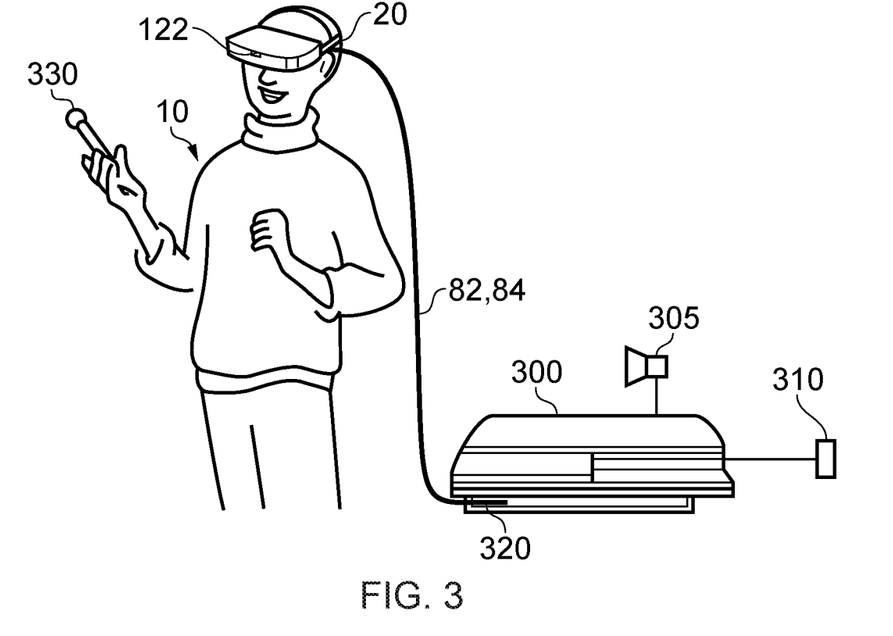
FIGS. 3 and 4 schematically illustrate a user wearing an HMD connected to a Sony® PlayStation ® games console.

FIG. 3 schematically illustrates a user wearing an HMD connected to a Sony® PlayStation® games console 300 as an example of a base device. The games console 300 is connected to a mains power supply 310 and (optionally) to a main display screen (not shown). A cable, acting as the cables 82, 84 discussed above (and so acting as both power supply and signal cables), links the HMD 20 to the games console 300 and is, for example, plugged into a USB socket 320 on the console 300. Note that in the present embodiments, a single physical cable is provided which fulfils the functions of the cables 82, 84. In FIG. 3, the user is also shown holding a hand-held controller 330 which may be, for example, a Sony® Move® controller which communicates wirelessly with the games console 300 to control (or to contribute to the control of) operations relating to a currently executed program at the games console.

A camera 305 is associated with the console 300 to capture images of the user 10 and/or the controller 330.

The video displays in the HMD 20 are arranged to display images provided via the games console 300, and the earpieces 60 in the HMD 20 are arranged to reproduce audio signals generated by the games console 300. The games console may be in communication with a video server. Note that if a USB type cable is used, these signals will be in digital form when they reach the HMD 20, such that the HMD 20 comprises a digital to analogue converter (DAC) to convert at least the audio signals back into an analogue form for reproduction.

Images from the camera 122 mounted on the HMD 20 are passed back to the games console 300 via the cable 82, 84. Similarly, if motion or other sensors are provided at the HMD 20, signals from those sensors may be at least partially processed at the HMD 20 and/or may be at least partially processed at the games console 300. The use and processing of such signals will be described further below.

The USB connection from the games console 300 also provides power to the HMD 20, according to the USB standard.

Figure 4:
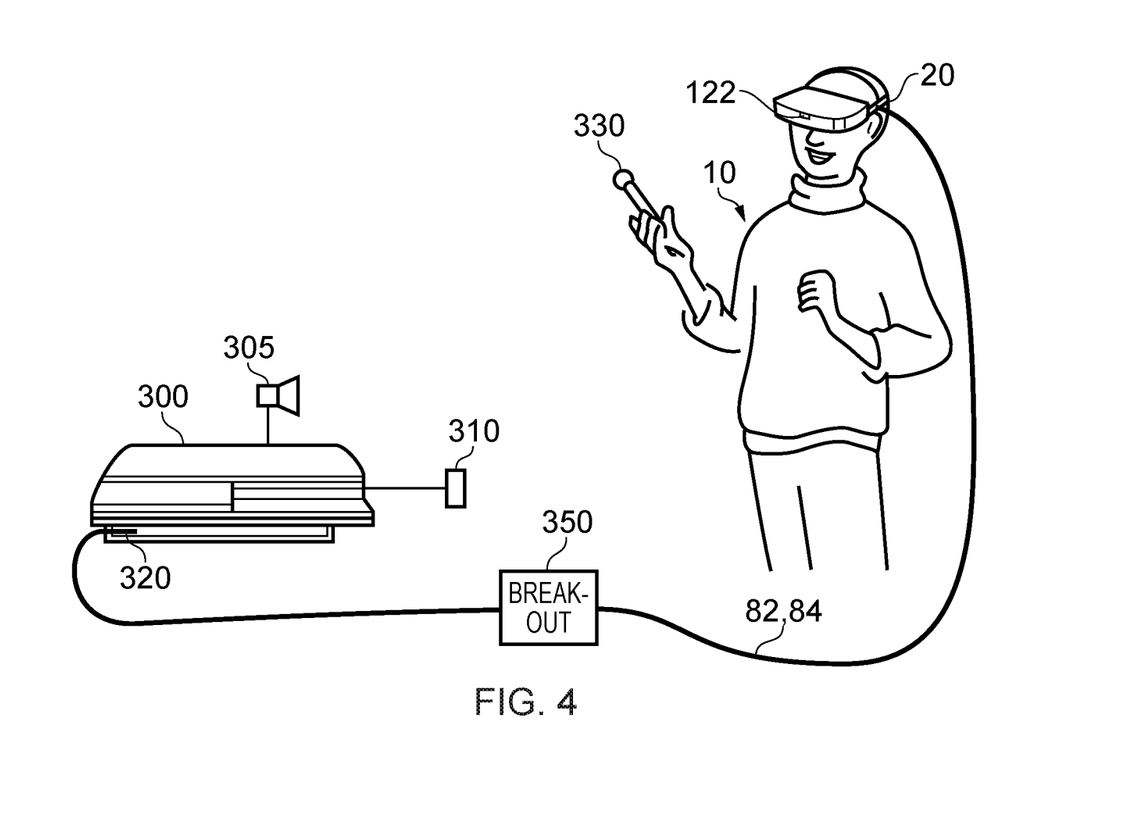

FIG. 4 schematically illustrates a similar arrangement in which the games console is connected (by a wired or wireless link) to a so-called "break out box" acting as a base or intermediate device 350, to which the HMD 20 is connected by a cabled link 82, 84. The breakout box has various functions in this regard. One function is to provide a location, near to the user, for some user controls relating to the operation of the HMD, such as (for example) one or more of a power control, a brightness control, an input source selector, a volume control and the like. Another function is to provide a local power supply for the HMD (if one is needed according to the embodiment being discussed). Another function is to provide a local cable anchoring point. In this last function, it is not envisaged that the break-out box 350 is fixed to the ground or to a piece of furniture, but rather than having a very long trailing cable from the games console 300, the break-out box provides a locally weighted point so that the cable 82, 84 linking the HMD 20 to the break-out box will tend to move around the position of the break-out box. This can improve user safety and comfort by avoiding the use of very long trailing cables.

It will be appreciated that the localisation of processing in the various techniques described in this application can be varied without changing the overall effect, given that an HMD may form part of a set or cohort of interconnected devices (that is to say, interconnected for the purposes of data or signal transfer, but not necessarily connected by a physical cable). So, processing which is described as taking place "at" one device, such as at the HMD, could be devolved to another device such as the games console (base device) or the break-out box. Processing tasks can be shared amongst devices. Source (for example, sensor) signals, on which the processing is to take place, could be distributed to another device, or the processing results from the processing of those source signals could be sent to another device, as required. So any references to processing taking place at a particular device should be understood in this context.

As mentioned above, in some uses of the HMD, such as those associated with panoramic video content viewing, virtual reality (VR) or augmented reality (AR) systems, the user's viewpoint needs to track movements with respect to a real or virtual space in which the user is located.

This tracking is carried out by detecting motion of the HMD and varying the apparent viewpoint of the displayed images so that the apparent viewpoint tracks the motion.

In embodiments of the disclosure, processing is carried out to change the lighting conditions as viewed by the HMD wearer in response to changes in the real ambient lighting conditions experienced by that user, or to change the real ambient lighting conditions experienced by the HMD user in response to changes in the lighting conditions as viewed by the HMD wearer. This is an example of the use of a head mountable display (HMD) system comprising: a detector to detect an illumination level in one of a display image for display to a user via an HMD and an ambient environment around the HMD; and a controller to control an illumination level in the other of the display image for display to a user via an HMD and the ambient environment around the HMD, according to (or in response to) the detection.

An example of this type of variation will be discussed with reference to FIGS. 5 to 8.

Figure 5:
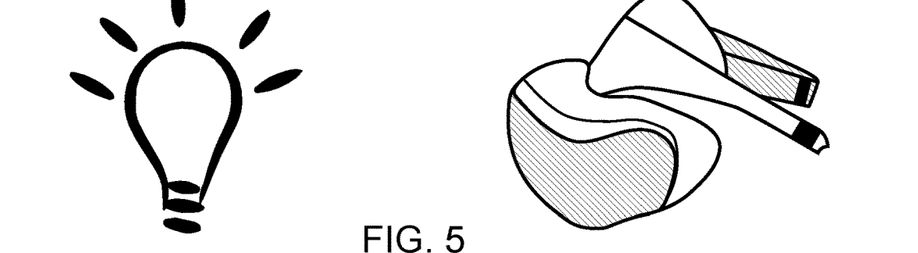
FIG. 5 schematically illustrates an HMD in bright ambient lighting conditions.
Figure 6:
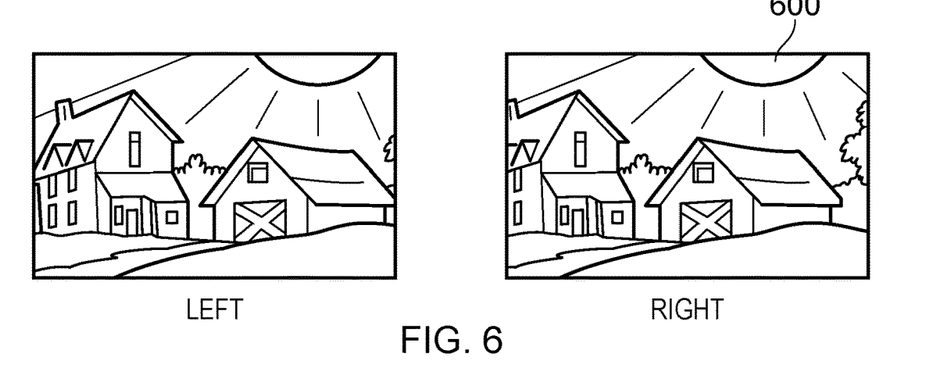
FIG. 6 schematically illustrates a pair of example display images to be displayed by the HMD of FIG. 5.

FIG. 5 schematically illustrates an HMD in bright ambient lighting conditions, and FIG. 6 schematically illustrates a pair of example display images to be displayed by the HMD of FIG. 5 (with an example sun 600 showing the images represent a bright scene). The example of FIGS. 5 and 6 applies to either type of variation (varying the lighting of the display images as viewed by the HMD, or varying the external ambient lighting conditions). A brighter external ambient lighting level corresponds to a brighter as-viewed lighting level in the HMD images.

Figure 7:
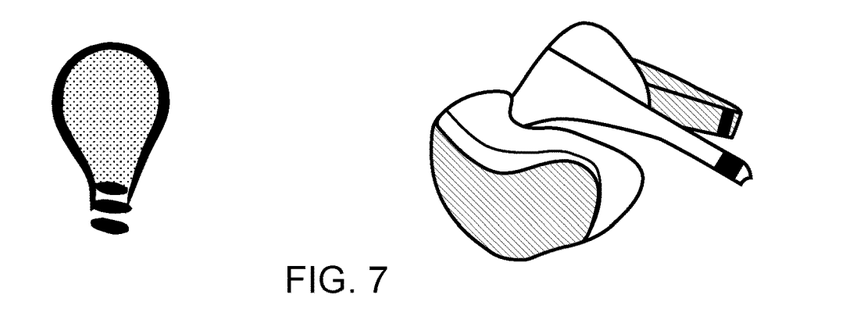
FIG. 7 schematically illustrates an HMD in dim ambient lighting conditions.
Figure 8:
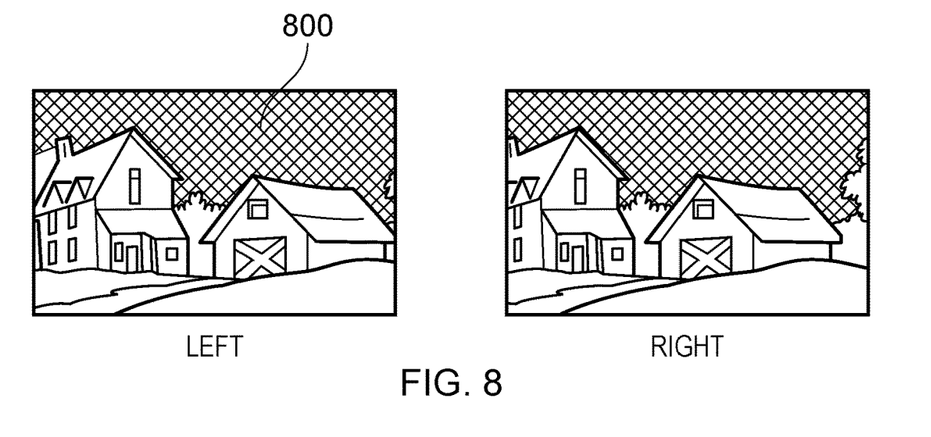
FIG. 8 schematically illustrates a pair of example display images to be displayed by the HMD of FIG. 7.

FIG. 7 schematically illustrates an HMD in dim ambient lighting conditions and FIG. 8 schematically illustrates a pair of example display images to be displayed by the HMD of FIG. 7 (with example clouds or a darker sky 800 to represent a darker scene). Again, the example of FIGS. 7 and 8 applies to either type of variation (varying the lighting of the display images as viewed by the HMD, or varying the external ambient lighting conditions). A darker external ambient lighting level corresponds to a darker as-viewed lighting level in the HMD images.

Figure 9:
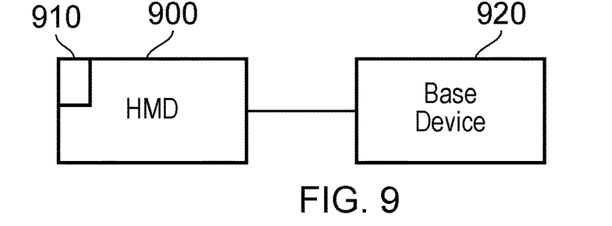
FIGS. 9 and 10 schematically illustrate example configurations of an HMD system.
Figure 10:
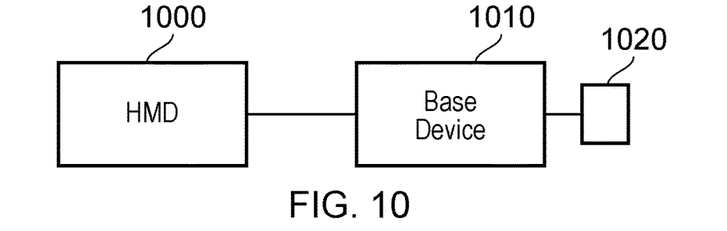
Figure 11:
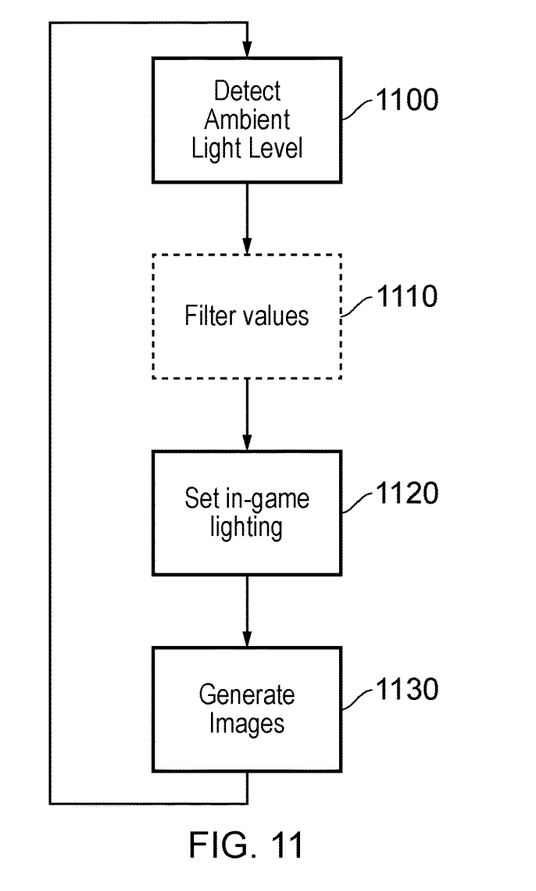
FIG. 11 is a schematic flowchart showing operations of an example HMD system.

FIGS. 9 and 10 schematically illustrate example configurations of an HMD system, and FIG. 11 is a schematic flowchart showing operations of an example HMD system. These examples relate to an arrangement in which the as-viewed lighting level in the HMD images is varied in response to a detected external ambient lighting level.

In FIG. 9, an HMD 900 comprises a light level sensor 910 as an example of an optical detector. An example of such a sensor is the camera 122 in FIG. 1. In an alternative, in place of (or in addition to) the camera 122, a sensor such as a photocell or photo resistor could be provided on the HMD. If a camera is used, its sole function could be that of a light level sensor, or its images could also be used for other purposes as well.

A base device 920 provides display images for display by the HMD 900. A games machine and/or breakout box (of the types shown in FIGS. 3 and 4) are examples of base devices. Note however that all of the processing being described here could in fact be implemented as part of circuitry forming the HMD 900. The HMD and base device are connected by a wired or wireless link as discussed above.

An alternative arrangement is shown in FIG. 10, in which an HMD 1000 is associated with a base device 1010, which in turn is associated with a light level sensor 1020. An example of such a light level sensor is the camera 305 of FIGS. 3 and 4. Again, the images from the camera 305 could be used only for light level sensing, or could be used for other purposes as well as light sensing. In an alternative, a light sensor of another type such as those discussed above could be associated with the console 300 or breakout box 350.

FIG. 11 provides a schematic flowchart illustrating operations of the arrangements of FIG. 9 or 10.

The example considered in FIG. 11 relates to game play, in which the base device comprises a game engine to generate display images for display by the HMD.

At a step 1100, the system (for example, the base device) detects the ambient light level appropriate to the HMD wearer, for example making use of a signal from the sensor 910 or 1020.

At an optional step 1110, the detected light levels are filtered, for example by applying a low pass filter so as to avoid (or reduce the effect of) any abrupt changes in light level. An example time constant for such a filter is 10 seconds.

At a step 1120, an in-game lighting level is set in response to the detected (or detected-and-filtered) light levels. If the ambient light level reduces, the in-game lighting is dimmed. if the ambient light level increases, the in-game light level is increased. The variation can be with respect to a respective base in-game light level associated with each in-game scene. So, each scene has its own "normal" light level, and variations are made, for example by applying a weighting of, say, between −25% and +25%, to the normal light level. In examples, this can be applied by a simple scaling of light levels. In other examples, the scene can be changed amongst pre-determined alternative scenes, for example a scene on a sunny day, the same scene but on an overcast day, and the same scene on a moonlit evening.

At a step 1130, display images for display by the HMD are generated by the game engine according to the lighting levels established in the step 1120.

The process then repeats. In some examples, the loop of FIG. 11 could be carried out at every generated display image, which is to say, at the frame rate of the system. In other examples, the loop is carried out every n generated frames, or every m seconds (for example, n could be 100 or m could be 2).

Figure 12:
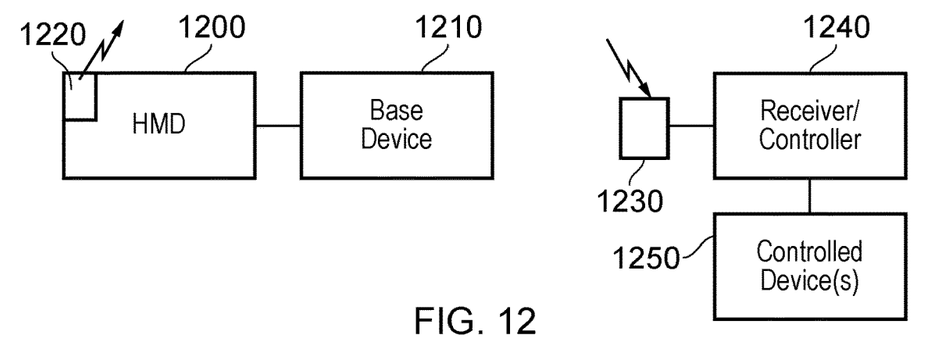
FIGS. 12 and 13 schematically illustrate further example configurations of an HMD system.
Figure 13:
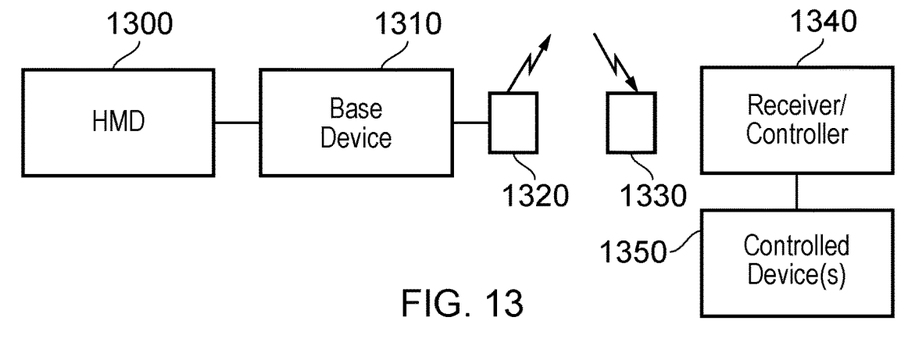
Figure 14:
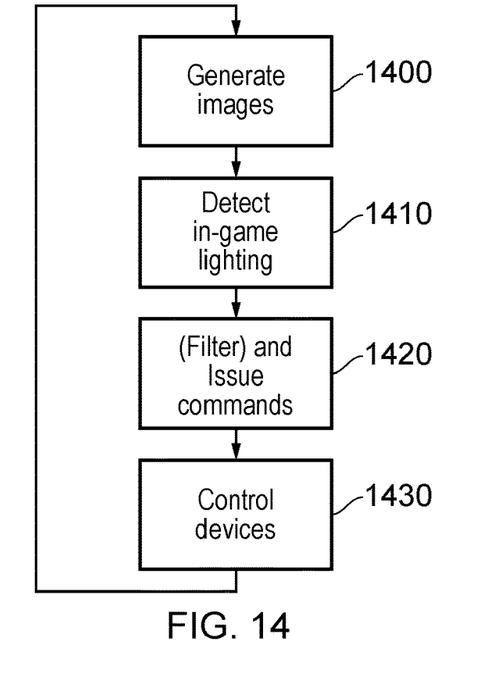
FIG. 14 is a schematic flowchart showing operations of an example HMD system.

FIGS. 12 and 13 schematically illustrate further example configurations of an HMD system, and FIG. 14 is a schematic flowchart showing operations of an example HMD system. In these examples, ambient light levels are varied in response to light levels as viewed in the HMD display images.

FIG. 12 schematically illustrates an HMD 1200 and a base device 1210, of the types discussed above (and noting that, once again, the entire functionality of the HMD and base device could in fact be implemented by circuitry of the HMD). The HMD comprises a data transmitter 1220 for sending control signals or commands to a data receiver 1230 associated with a receiver/controller 1240. The data connection can be a wired or (as in the example drawn) wireless connection. The receiver/controller acts on the received commands to control one or more controlled devices 1250. Examples of the controlled devices 1250 include lights. So, in these examples, the receiver/controller 1240 acts on the received commands to vary the illumination provided by the controlled devices 1250. Where the controlled devices are in the same physical location (such as a room) as the rest of the system, this will vary the ambient illumination as experienced by the HMD wearer.

FIG. 13 provides a similar arrangement, but in which the data transmitter 1320 is associated with the base device 1310 rather than with the HMD 1300. The parts 1330, 1340, 1350 act in the same way as the corresponding parts 1230, 1240, 1250 described above.

FIG. 14 is a schematic flowchart illustrating example operations of the arrangements of FIG. 12 or 13.

At a step 1400, the base device generates display images for display by the HMD. For example, these may be game images.

At a step 1410, the in-game lighting level is detected by a detector, for example by a process running on the base device.

At a step 1420, the system optionally filters the detected light levels (to avoid or reduce the effect of abrupt changes, as discussed above) and issues commands to the receiver/controller via the data connection discussed above. At a step 1430, the receiver/controller controls the one or more controlled devices (such as lights) according to the received commands.

Therefore, in FIGS. 9 and 10, the base device provides an example of an HMD system having a detector to detect an illumination level in an ambient environment around the HMD; and a controller to control an illumination level in a display image for display to a user via an HMD, according to the detection. As an example, the detector may comprise an optical detector (such as a camera or other light sensor) mounted on the HMD. The system may comprise a game engine to generate display images, in which the controller is configured to control operation of the game engine so as to vary the in-game illumination of the generated display images.

In FIGS. 12 and 13, the base device provides an example of an HMD system having a detector to detect an illumination level in a display image for display to a user via an HMD; and a controller to control an illumination level in the ambient environment around the HMD, according to the detection. The system may comprise a game engine to generate display images, in which the detector is configured to detect the in-game illumination of the generated display images. The system may comprise a data link to a lighting controller; and a command generator to generate lighting control commands for transmission to the lighting controller. The data link may be a wireless data link.

FIGS. 12 and 13, when including the receiver/controller, provide an example of a lighting system comprising an HMD system as defined above and a lighting controller connectable to one or more controllable light sources and connected to a data link to receive lighting control commands from the HMD system.

In either instance, the controller may be configured to respond to a reduction in illumination as detected by the detector, to control a reduction in the illumination level controlled by the controller; and to respond to an increase in illumination as detected by the detector, to control an increase in the illumination level controlled by the controller.

In either instance, the detector may comprise a filter to filter the detected illumination levels.

The HMD system may include the HMD itself, or may be connectable to the HMD.

Figure 15:
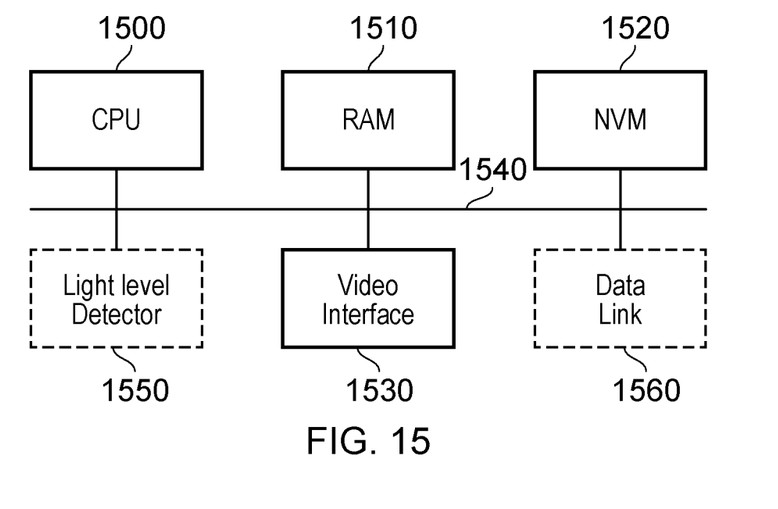
FIG. 15 schematically illustrates a data processor.

FIG. 15 schematically illustrates a data processor which may provide processing discussed in connection with the base device, the HMD or both. The data processor comprises a central processing unit (CPU) 1500, a random access memory (RAM) 1510, a non-volatile memory (NVM) 1520 such as disk storage and/or read only memory (ROM) and a video interface 1530 for providing display images for display to the user, interconnected by a bus structure 1540. Optionally, a light level detector 1550 such as a photocell or camera is provided for detecting ambient light levels; the processing of the detection can be carried out by the CPU 1500. Optionally, a data link 1560 is provided for providing a data connection to a lighting controller. The data processor operates according to the methods discussed in the present description, for example under the control of computer software such as computer software comprising successive machine-readable instructions which, when executed by the data processor of FIG. 15, cause the data processor of FIG. 15 to carry out one or more of the method steps discussed here. The software may be provided by a storage medium such as a non-transitory, machine-readable storage medium (for example, a disk medium or the NVM 1520).

Figure 16:
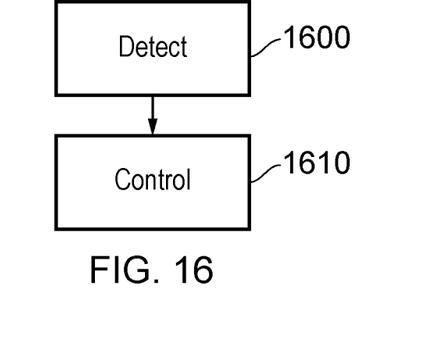
FIG. 16 is a schematic flowchart illustrating a method.

FIG. 16 is a schematic flowchart illustrating a method. The method (for example, a method of operation of an HMD system) involves:

detecting (at a step 1600) an illumination level in one of a display image for display to a user via an HMD and an ambient environment around the HMD; and controlling (at a step 1610) an illumination level in the other of the display image for display to a user via an HMD and the ambient environment around the HMD.

Figure 17:
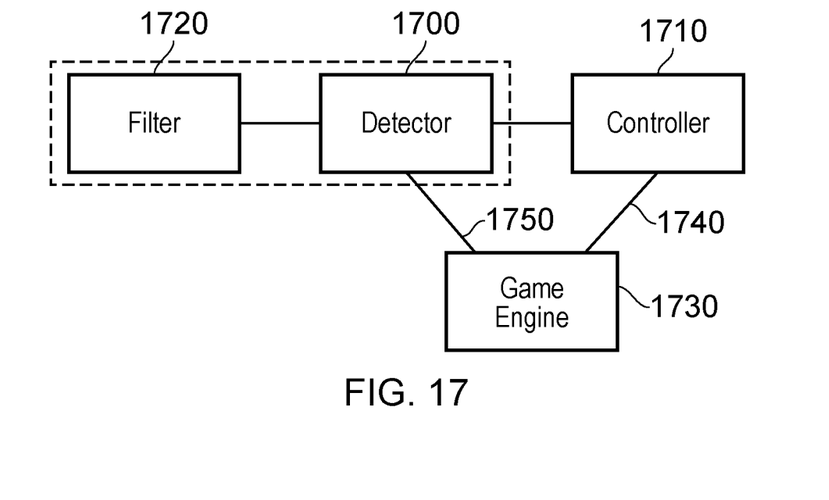
FIG. 17 is a schematic block diagram of an example HMD system.

FIG. 17 is a schematic block diagram of an example HMD system comprising a detector 1700 to detect an illumination level in one of a display image for display to a user via an HMD and an ambient environment around the HMD; and a controller 1710 to control an illumination level in the other of the display image for display to a user via an HMD and the ambient environment around the HMD. Optionally, the detector 1700 comprises a filter 1720 to filter the detected illumination levels. Optionally, the system may include a game engine 1730 to generate display images; in which either (a) the controller is configured to control operation of the game engine so as to vary the in-game illumination of the generated display images (in which case a signal connection 1740 is used) or (b) the detector is configured to detect the in-game illumination of the generated display images (in which case a signal connection 1750 is used).

The present techniques can be useful in various scenarios. For example, if a see-through (or partially-see-through) HMD is used, in which at least a portion of the outside world can be seen while the wearer is wearing the HMD, then it can be helpful to match the ambient to the in-game lighting to provide a better viewing experience. Such a see-through HMD can be provided by a full immersion HMD in which a front-facing camera (such as the camera 122) provides an image for display of the outside world, or by an HMD in which the optics in front of the user's eyes provide at least a partial view of the outside world.

In other examples, the detection and control steps can be carried out only in respect of periods of time at the start and/or end of gameplay, so as to ease the user into and out of the game environment by providing a closer match between ambient and in-game lighting. For example, at the start of gameplay, the adjustment of either the in-game or the ambient lighting (as the case may be) can be ramped downwards from an initial starting point so that a larger adjustment is made at the very start of gameplay or other usage, but the degree of adjustment is reduced (for example, linearly with time) so that after a period of time such as one minute, no adjustment is being made. Similarly, the last period of gameplay (such as a final minute, for example during a close down sequence) can be characterised by a ramped increasing adjustment so that the degree of adjustment varies from no adjustment (one minute, or another period, before the end of gameplay) to a final, higher, level of adjustment just before or at the end of gameplay or other usage.

The final period of gameplay can be triggered by the user executing a command to terminate gameplay or other usage, or can be triggered by the system detecting that the end of gameplay (or the end of other usage, such as the end of a video playback) is approaching.

Therefore, in examples, the controller is configured to vary the illumination level only during one or both of an initial period of usage and a last period of usage of the HMD by the user. For example, the controller can be configured to decrease a degree of variation of the illumination level during an initial period of usage so that after a predetermined period such as two minutes, no variation is applied. For example, the controller can be configured to increase a degree of variation of the illumination level during a last period (for example of two minutes) of usage.

The adjustments can be made relative to a base or normal value of illumination level in the ambient or in-HMD lighting.

Various respective aspects and features are defined by the following numbered clauses.

1. A head mountable display (HMD) system comprising:
   a detector to detect an illumination level in one of a display image for display to a user via an HMD and an ambient environment around the HMD; and
   a controller to control an illumination level in the other of the display image for display to a user via an HMD and the ambient environment around the HMD, according to the detection.

2. A system according to clause 1, in which:
   the controller is configured to respond to a reduction in illumination as detected by the detector, to control a reduction in the illumination level controlled by the controller; and to respond to an increase in illumination as detected by the detector, to control an increase in the illumination level controlled by the controller.

3. A system according to clause 1 or clause 2, comprising:
   a head-mountable display to display the display image.

4. A system according to any one of clauses 1 to 3, in which:
   the detector is configured to detect the illumination level in the ambient environment around the HMD; and
   the controller is configured to control the illumination level in the display image for display to the user via the HMD.

5. A system according to clause 4, in which:
   the detector comprises an optical detector mounted on the HMD.

6. A system according to clause 4 or clause 5, in which:
   the detector comprises a filter to filter the detected illumination levels.

7. A system according to any one of clauses 4 to 6, comprising:
   a game engine to generate display images;
   in which the controller is configured to control operation of the game engine so as to vary the in-game illumination of the generated display images.

8. A system according to any one of clauses 1 to 3, in which:
   the detector is configured to detect the illumination level in the display image for display to the user via the HMD; and
   the controller is configured to control the illumination level in the ambient environment around the HMD.

9. A system according to clause 8, comprising:
   a game engine to generate display images;
   in which the detector is configured to detect the in-game illumination of the generated display images.

10. A system according to clause 8 or clause 9, in which:
    the detector comprises a filter to filter the detected illumination levels.

11. A system according to any one of clauses 8 to 10, in which the controller comprises:
    a data link to a lighting controller; and
    a command generator to generate lighting control commands for transmission to the lighting controller.

12. A system according to clause 11, in which the data link is a wireless data link.

13. A system according to any one of the preceding clauses, in which the controller is configured to vary the illumination level only during one or both of an initial period of usage and a last period of usage of the HMD by the user.

14. A system according to clause 13, in which the controller is configured to decrease a degree of variation of the illumination level during an initial period of usage so that after a predetermined period, no variation is applied.

15. A system according to clause 13 or clause 14, in which the controller is configured to increase a degree of variation of the illumination level during a last period of usage.

16. A lighting system comprising:
an HMD system according to clause 11 or clause 12; and
a lighting controller connectable to one or more controllable light sources and connected to a data link to receive lighting control commands from the HMD system.

17. A method comprising:
detecting an illumination level in one of a display image for display to a user via an HMD and an ambient environment around the HMD; and
controlling an illumination level in the other of the display image for display to a user via an HMD and the ambient environment around the HMD, according to the detection.

18. Computer software which, when executed by a computer, causes the computer to carry out the method of clause 17.

19. A non-transitory machine-readable storage medium which stores computer software according to clause 18.

It will be appreciated that the techniques are not limited to gameplay but can be applied to other types of usage such as video playback. In such examples, the brightness level of the video material can be detected, and the ambient lighting varied as discussed above. Or the ambient lighting can be detected and the brightness level of the video playback varied.

It will be apparent that numerous modifications and variations of the present disclosure are possible in light of the above teachings. It is therefore to be understood that within the scope of the appended claims, the disclosure may be practised otherwise than as specifically described herein.

The invention claimed is:

1. A head mountable display (HMD) system comprising:
a detector configured to detect a first illumination level in a first one of a display image for display to a user via an HMD and an ambient environment around the HMD; and
a controller configured to control a second illumination level in a second one of the display image for display to a user via an HMD and the ambient environment around the HMD, according to the detection.

2. A system according to claim 1, in which:
the controller is configured to respond to a reduction in illumination as detected by the detector, to control a reduction in the second illumination level controlled by the controller; and to respond to an increase in illumination as detected by the detector, to control an increase in the second illumination level controlled by the controller.

3. A system according to claim 1, comprising:
a head-mountable display to display the display image.

4. A system according to claim 1, in which:
the detector is configured to detect the first illumination level in the ambient environment around the HMD; and
the controller is configured to control the second illumination level in the display image for display to the user via the HMD.

5. A system according to claim 4, in which:
the detector comprises an optical detector mounted on the HMD.

6. A system according to claim 4, in which:
the detector comprises a filter to filter the detected illumination levels.

7. A system according to claim 4, further comprising:
a games console configured to generate display images;
in which the controller is configured to control operation of the games console so as to vary in-game illumination of the generated display images.

8. A system according to claim 1, in which:
the detector is configured to detect the first illumination level in the display image for display to the user via the HMD; and
the controller is configured to control the second illumination level in the ambient environment around the HMD.

9. A system according to claim 8, further comprising:
a games console configured to generate display images;
in which the detector is configured to detect in-game illumination of the generated display images.

10. A system according to claim 8, in which:
the detector comprises a filter to filter the detected illumination levels.

11. A system according to claim 8, in which the controller comprises:
a data link to a lighting controller; and
a command generator to generate lighting control commands for transmission to the lighting controller.

12. A system according to claim 11, in which the data link is a wireless data link.

13. A system according to claim 1, in which the controller is configured to vary the second illumination level only during one or both of an initial period of usage and a last period of usage of the HMD by the user.

14. A system according to claim 13, in which the controller is configured to decrease a degree of variation of the second illumination level during an initial period of usage so that after a predetermined period, no variation is applied.

15. A system according to claim 13, in which the controller is configured to increase a degree of variation of the second illumination level during a last period of usage.

16. A lighting system comprising:
the HMD system according to claim 11; and
a lighting controller connectable to one or more controllable light sources and connected to a respective data link to receive lighting control commands from the HMD system.

17. A method comprising:
detecting, by a detector, a first illumination level in a first one of a display image for display to a user via an HMD and an ambient environment around the HMD; and
controlling, by a controller, a second illumination level in a second one of the display image for display to a user via an HMD and the ambient environment around the HMD, according to the detection.

18. A non-transitory machine-readable storage medium having instructions stored thereon, the instructions, when executed by one or more processors, cause the processors to perform the method of claim 17.

* * * * *